United States Patent [19]

Yamazaki et al.

[11] Patent Number: 4,880,264
[45] Date of Patent: Nov. 14, 1989

[54] LATCH DEVICE FOR INCLINABLE BACK REST CUSHION MOUNTED IN SEATBACK

[75] Inventors: Hiroshi Yamazaki; Toshiyuki Hara, both of Yokohama; Yuji Tanaka; Takayuki Mouri, both of Ayase, all of Japan

[73] Assignees: Ikeda Bussan Co., Ltd., Ayase; Ohi Seisakusho Co., Ltd., Yokohama, both of Japan

[21] Appl. No.: 176,506

[22] Filed: Apr. 1, 1988

[30] Foreign Application Priority Data

Apr. 3, 1987 [JP] Japan .............................. 62-51262[U]

[51] Int. Cl.$^4$ .............................................. B60N 1/10
[52] U.S. Cl. .................................... 292/226; 297/379; 296/65.1; 292/336
[58] Field of Search ................. 296/65.1, 63; 297/379; 292/127, 121, 128, DIG. 14, DIG. 43, 332, 336, 216, 198, 99, 195, 226, 200

[56] References Cited

U.S. PATENT DOCUMENTS

| | | | |
|---|---|---|---|
| 3,262,725 | 7/1966 | Ballantyne | 297/379 X |
| 3,410,600 | 11/1968 | Thorpe | 296/66 |
| 3,807,790 | 4/1974 | Erard | 297/379 X |
| 4,146,267 | 3/1979 | Mori et al. | 297/379 X |
| 4,637,648 | 1/1987 | Okino et al. | 297/379 X |
| 4,667,492 | 5/1987 | Tomatsu et al. | 297/379 X |
| 4,708,385 | 11/1987 | Kondo | 297/379 X |
| 4,721,338 | 1/1988 | Kondo | 297/379 |
| 4,765,682 | 8/1988 | Satoh | 297/379 |

FOREIGN PATENT DOCUMENTS

| | | | |
|---|---|---|---|
| 59-190635 | 12/1984 | Japan . | |
| 57436 | 3/1986 | Japan | 297/379 |
| 220944 | 10/1986 | Japan | 297/65.1 |
| 46730 | 2/1987 | Japan | 297/379 |

Primary Examiner—Gary L. Smith
Assistant Examiner—Eric K. Nicholson
Attorney, Agent, or Firm—Foley & Lardner, Schwartz, Jeffery, Schwaab, Mack, Blumenthal & Evans

[57] ABSTRACT

A latch device is disclosed which latches an inclinable back rest cushion to a seatback when the cushion is snugly received in a tunnel formed in the seatback. The latch device comprises a striker fixed to the seatback, a stationary base member fixed to the seatback, a spring-biased latch member pivotally connected to the base member and latchingly engageable with the striker, a pull strap fixed to the latch member and exposed to the passenger room to be manipulated from the passenger room, a movable base member movably mounted on the stationary base member, a lock member pivotally mounted on the movable base member and movable to a position to obstruct the pivoting movement of the latch member in the striker releasing direction, a lock member actuating member pivotally mounted on the movable base member and engageable, when pushed by the striker, with the lock member to move the same away from the travelling path of the latch member, a lock cancelling member movably mounted on the movable base member and moving the latch member in the striker releasing direction when moved in a given direction by a given distance, and a structure connected to the movable base member to move therewith. The structure has a manually controlled lever which is projected outward from a slot formed in a back portion of the back rest cushion to be operable from a trunk room of the vehicle.

19 Claims, 5 Drawing Sheets

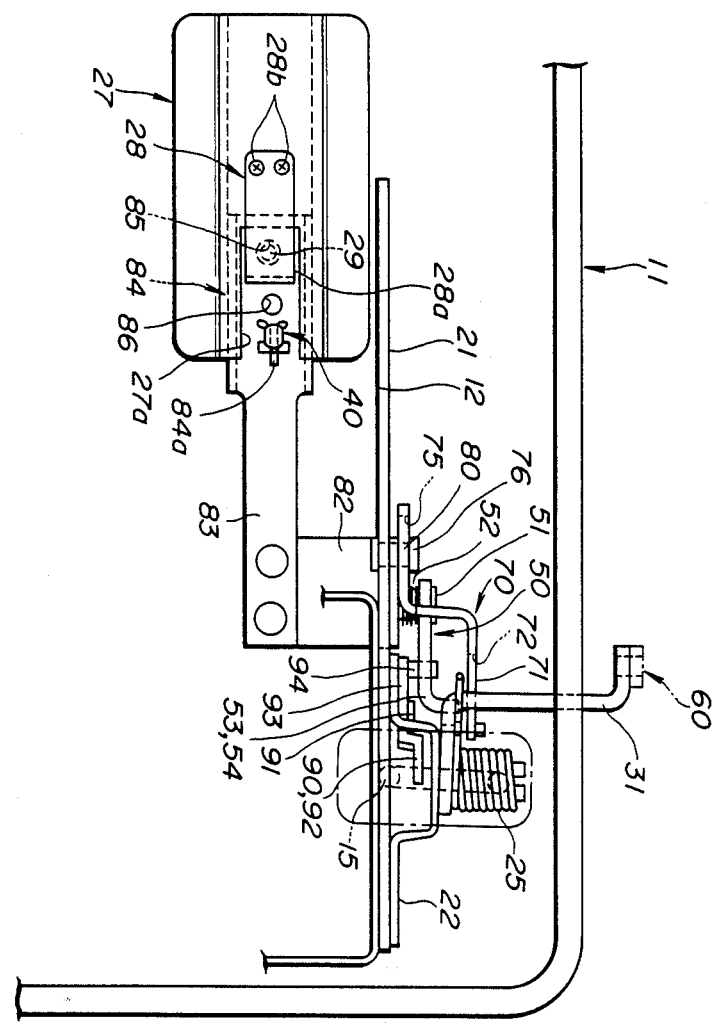

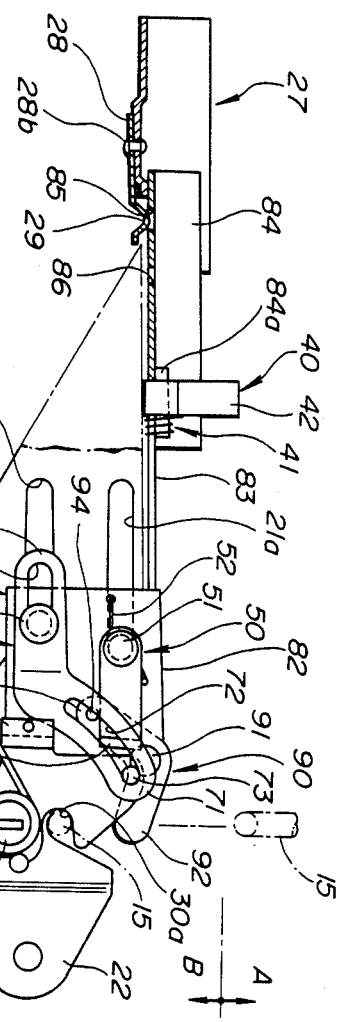
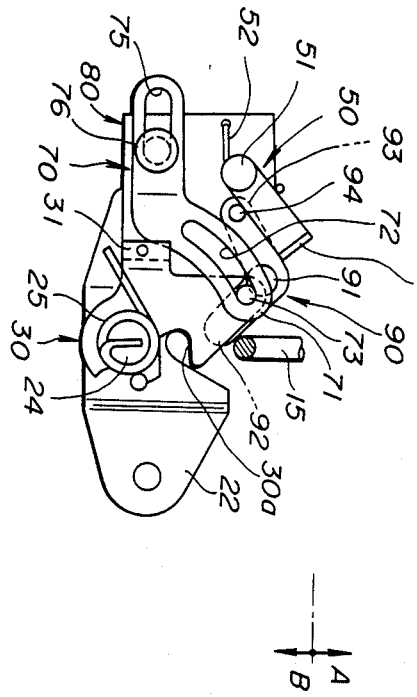

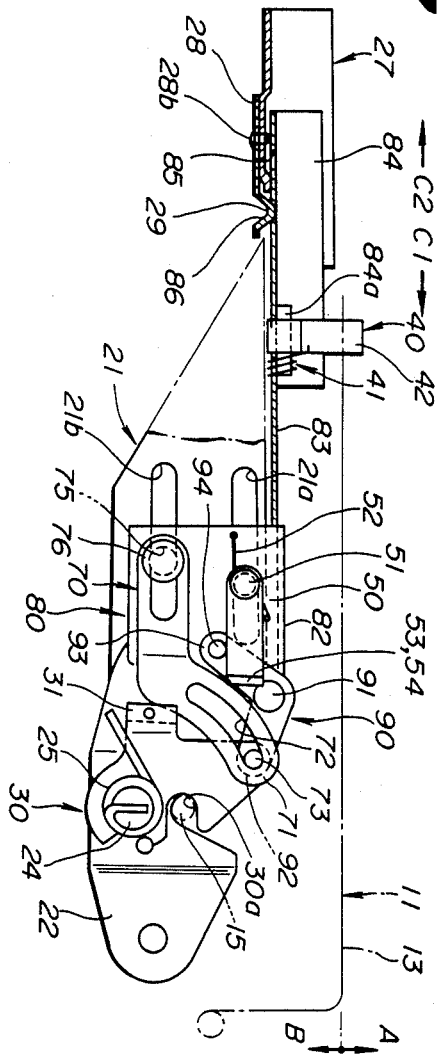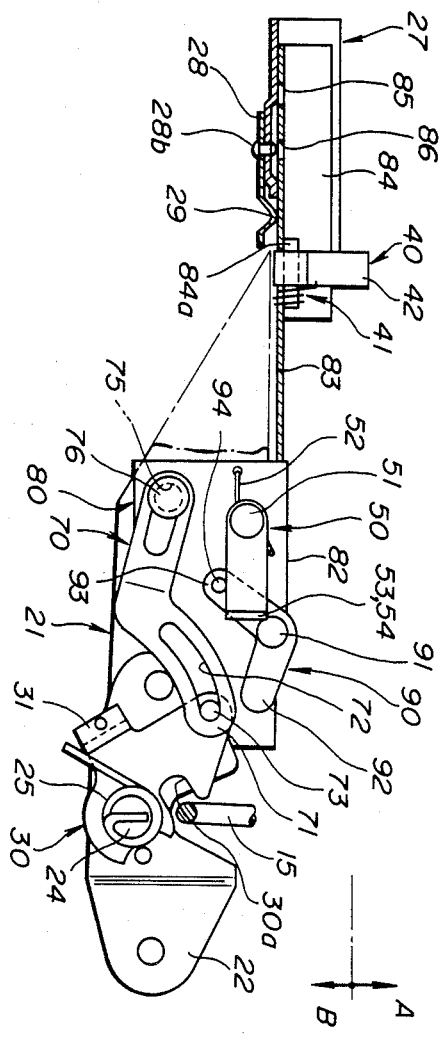

LATCH DEVICE FOR INCLINABLE BACK REST CUSHION MOUNTED IN SEATBACK

BACKGROUND OF THE INVENTION

1. Field of the Invention

The present invention relates in general to latch devices, and more particularly to latch devices of a type which latches a pivotal member. More specifically, the present invention is concerned with a latch device for latching an inclinable back rest cushion which is pivotally mounted in a rear seat seatback of a passenger motor vehicle to provide, when folded, a tunnel between a passenger room and a trunk room.

2. Description of the Prior Art

In order to clarify the task of the present invention, one conventional latch device will be outlined in the following, which is disclosed in Japanese Utility Model First Provisional Publication No. 59-190635.

In the device of the publication, a striker is fixed to a vehicle body, and a hook engageable with the striker is mounted to an inclinable back push button is mounted on the back rest to actuate the hook. A pull strap extends from the push button and is exposed to the passenger room. When the pull strap is pulled from the passenger room, the push button is moved and thus the hook is actuated to release the engagement with the striker thereby inducing a forward inclination of the back rest. A latch slider operable from the trunk room is incorporated with the push button. Once the latch slider assumes its operative position, the push button is prevented from moving. It is desirable to forwardly incline the back rest from the trunk room when loading baggages from the trunk into the passage room via the tunnel. To achieve this forward inclination, the catch must first be slid out of locking engagement with the push button. Next, the push button must be pushed to unlatch the latch. Then, the back rest may be inclined. Accordingly, there is a need to simplify this forward inclination.

SUMMARY OF THE INVENTION

It is therefore an object of the present invention to provide an improved latch device for use with an inclinable back rest cushion, which is free of the above-mentioned drawback.

According to the present invention, there is provided a latch device for the inclinable back rest cushion, by which the folding of the back rest cushion is available from the trunk room by a single operation even when the back rest cushion has been locked in the tunnel of the seatback.

According to the present invention, there is provided, in a seatback having in a tunnel thereof an inclinable back rest cushion, a latch device for latching the back rest cushion to the seatback when the same is snugly received in the tunnel. The latch device comprises a striker secured to the seatback; a base member fixed to the back rest cushion to move therewith; a latch member pivotally connected to the base member and latchingly engageable with the striker when the back rest cushion is received in the tunnel; a pull strap fixed to the latch member for pivoting the latch member in a direction to release the striker when pulled in a given direction; a lock member movably mounted to the base member, the lock member being movable to a position to obstruct the pivoting of the latch member in the striker releasing direction; a latch member actuating member movably mounted to the base member, the actuating member moving the lock member away from the travelling path of the latch member when pushed by the striker; a lock cancelling member movably mounted to the base member for moving the latch member in the striker releasing direction when moved in a given direction by a given distance; and means for manually moving both the lock member and the lock cancelling member from a back side of the back rest cushion.

BRIEF DESCRIPTION OF THE DRAWINGS

Other objects and advantages of the present invention will become apparent from the following description when taken in conjunction with the accompanying drawings, in which:

FIG. 4 is a back view of the latch device of the invention;

FIG. 5 is a plan view of the latch device of the invention;

FIG. 6 is a partial view of FIG. 5, but showing a different condition of the latch device of the invention; and FIGS. 7 and 8 are views similar to FIG. 5, but showing other conditions of the latch device of the invention.

DETAILED DESCRIPTION OF THE INVENTION

Figure 2:
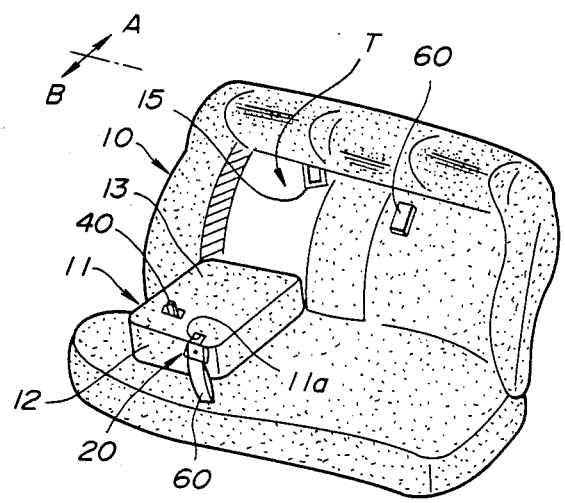
FIG. 2 is a perspective view of an automotive rear seat which is provided at the seatback thereof with an inclinable back rest cushion to which the latch device of the invention is practically applied.

Referring to FIG. 2 of the accompanying drawings, there is shown a rear seat of a passenger motor vehicle, which comprises a seat cushion (no numeral) and a seatback 10. The seatback 10 is equipped with an inclinable back rest cushion 11 which is usually put in a tunnel "T" formed in the seatback 10. When thus the back rest cushion 11 is folded (viz., inclined forward) as shown in the drawing, the tunnel "T" becomes exposed to a passenger room "B" thereby connecting the room "B" with a trunk room "A" located behind the rear seat. Although not shown in the drawing, a known hinge mechanism is arranged between a rear end of the seat cushion and a lower portion of the back rest cushion 11 to achieve the pivotal movement of the cushion 11 relative to the seatback 10.

A latch device 20 of the invention is mounted to the back rest cushion 11 to move therewith. As is seen from FIGS. 2 and 3, the latch device 20 is substantially entirely installed in the cushion 11. Designated by numeral 11a (see FIG. 2) is a slot which is formed in the back portion of the back rest cushion 11 for receiving therein a striker 15 upon raising of the cushion 11. The striker 15 is fixed to an upper wall of the tunnel "T".

Figure 1:
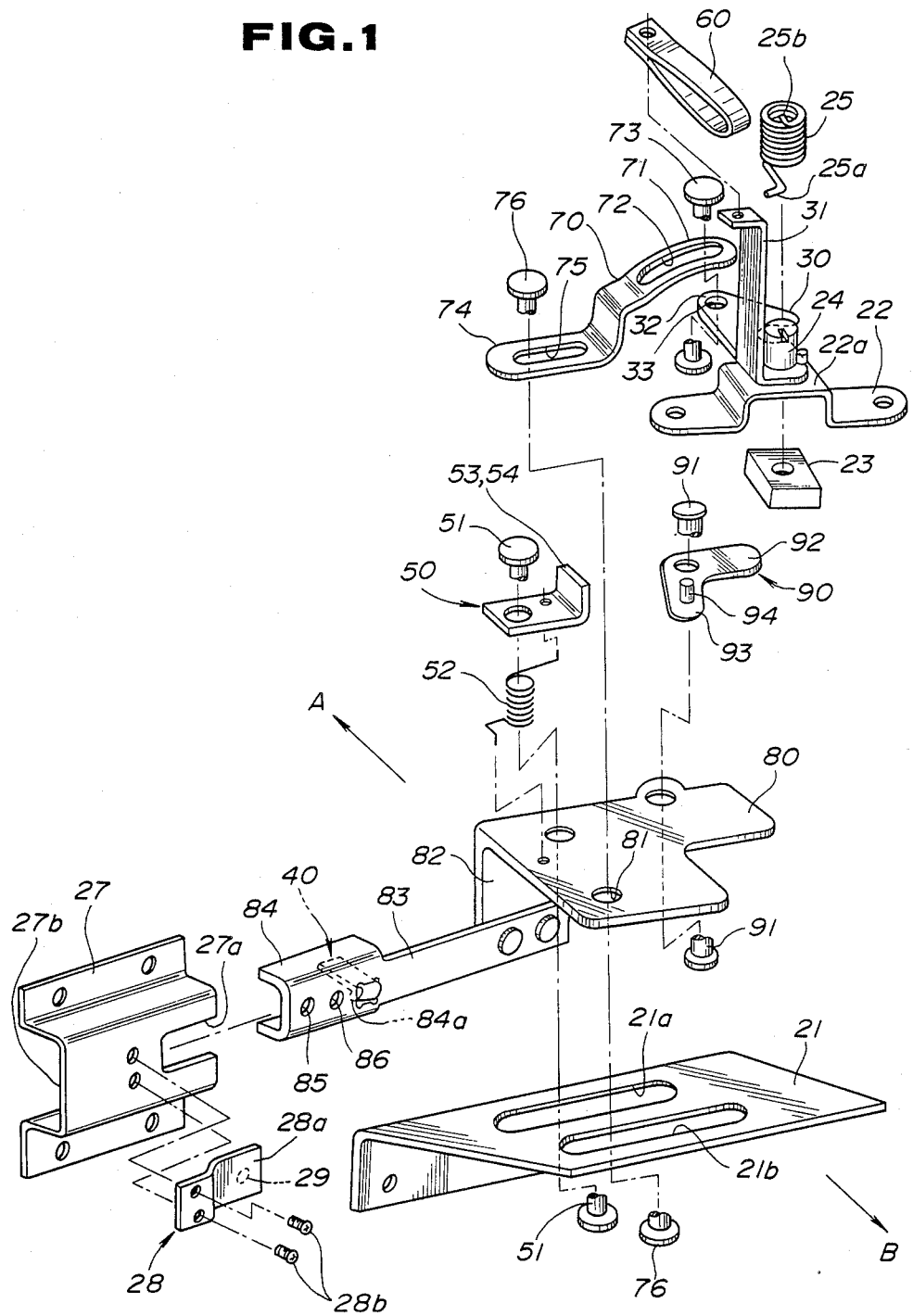
FIG. 1 is an exploded view of a latch device of the present invention.

As is understood from FIGS. 1 and 2, the latch device 20 comprises a base member 21 which is secured to a rigid frame member (not shown) installed in an upper portion 12 (see FIG. 4) of the back rest cushion 11.

As is seen from FIG. 1, a mounting bracket 22 is securely connected to the base member 21. The mounting bracket 22 has a raised center portion 22a for housing therein a bumper rubber piece 23 to which the striker 15 abuts upon raising of the back rest cushion 11.

A shaft 24 is secured to the raised portion 22a of the bracket 22. A latch member 30 is pivotally connected to the fixed shaft 24. The latch member 30 is exposed to the slot 11a (see FIG. 2) of the back rest cushion 11.

A coil spring 25 is disposed about the shaft 24 with one end 25a abutting against a raised flange 31 of the latch member 30 and the other end 26b hooked to a top of the shaft 24. With this spring 25, the latch member 30 is biased to pivot in a clockwise direction in FIGS. 1 and 5, that is, in a direction to establish a latching engagement with the striker 15. That is, as is seen from FIG. 5, the latch member 30 is formed with a cut 30a for catching the striker 15. When thus the latch member 30 is pivoted in a counterclockwise direction in FIG. 5 against the force of the spring 25, the latch member 30 is released from the striker 15.

Referring back to FIG. 1, a pull strap 60 is fixed to a head portion of the raised flange 31 of the latch member 30. A major portion of the strap 60 is exposed to the passenger room "B" even when the back rest cushion 11 is put in the tunnel "T". With this arrangement, when the pull strap 60 is pulled from the passenger room "B" with a certain force, the latch member 30 is pivoted in a counterclockwise direction in FIGS. 1 and 5 against the biasing force of the spring 25 thereby releasing the striker 15.

As is seen from FIGS. 1 to 5, for suppressing the counterclockwise movement of the latch member 30, there is employed a lock piece 50 which is mounted on a movable base member 80 which is movably mounted on the fixed base member 21. The lock piece 50 is pivotally connected to the movable base member 80 through a pivot pin 51. A coil spring 52 is disposed about the pivot pin 51 to bias the lock piece 50 in a clockwise direction in FIGS. 1 and 5. For this, one end of the spring 52 is put in a hole (no numeral) formed in the lock piece 50 and the other end of the same is put in a hole (no numeral) formed in the movable base member 80, as well shown in FIG. 1. The pivot pin 51 is slidably mated with an elongate opening 21a formed in the fixed base member 21. That is, when the movable base member 80 is moved relative to the fixed base member 21, the pivot pin 51 moves in and along the elongate opening 21a. For the purpose which will be clarified hereinafter, the fixed base member 21 is formed with another elongate opening 21b which is arranged in parallel with the opening 21a, and the movable base member 80 is formed with an opening 81.

The lock piece 50 has one end 53 which is bent upward to form a stopper flange 54 which is engageable with a leading end 32 of the latch member 30.

A crank lever 90 is pivotally connected through a pivot pin 91 to the movable base member 80 for actuating the lock piece 50 against the biasing force of the spring 52. That is, upon operation, the crank lever 90 abuts on the end 53 of the lock piece 50 to pivot the same in a counterclockwise direction in FIGS. 1 and 5. One arm portion 92 of the lever 90 is constructed and arranged to contact with the striker 15 upon raising of the back rest cushion 11. The other arm portion 93 of the lever 90 is provided with a pin 94. The pin 94 is engageable with the end 53 of the lock piece 50. That is, when the crank lever 90 is pivoted in a clockwise direction in FIGS. 1 and 5, the pin 94 of the lever 90 pivots the lock piece 50 about the pivot pin 51 in a counterclockwise direction in the drawings. This will be well understood from FIG. 6.

A lock cancelling lever 70 is connected to the leading end 32 of the latch member 30, which functions to cancel the locked condition of the latch member 30. The leading end 32 is formed with an opening 33. As is seen from FIG. 1, the lock cancelling lever 70 has an arcuate portion 71 raised from the other straight portion 74. An arcuate slot 72 is formed in and along the arcuate portion 71 of the lever 70. A connecting pin 73 is passed through both the arcuate slot 72 and the opening 33 of the latch member 30 for achieving a pivotal connection between the lock cancelling lever 70 and the latch member 30. The straight portion 74 is formed with a slot 75.

A connecting pin 76 is passed through the slot 75, the opening 81 of the movable base member 80 and the elongate opening 21b of the fixed base member 21 for achieving a slidable connection therebetween. Due to this arrangement, the movable base member 80 is movable axially without causing movement of the lock cancelling lever 70. This will be well understood from FIGS. 5 and 7.

That is, when the movable base member 80 is moved in the direction of the arrow "C2" from the position shown in FIG. 5, the connecting pin 76 travels in the slot 75 then abuts on a left end of the slot 75. Thereafter, the connecting pin 76 pulls the lock cancelling lever 70 in the same direction thereby, as is seen from FIGS. 7 and 8, causing the right end of the arcuate slot 72 to pull the connecting pin 73, and thus pivoting the latch member 30 in a counterclockwise direction in the drawings. As is seen from FIG. 8, such pivoting of the latch member 30 releases the striker 15 from the latch member 30.

Referring back to FIG. 1, the movable base member 80 is formed with a downwardly extending flange 82 which has a horizontal arm member 83 fixed thereto. The leading end of the arm member 83 is formed with a channel-shaped guided portion 84 which is slidably received in a groove 27b of a guide member 27 fixed to the rigid frame of the back rest cushion 11. The guided portion 84 is formed at its bottom wall portion with first and second openings 85 and 86.

The guide member 27 is formed at the bottom wall of the groove 27b with a cut 27a which faces toward the movable base member 80. A resilient piece 28 is fixed to the bottom wall of the guide member in such a manner that a leading end 28a thereof is placed in the cut 27a. The leading end 28a is formed at its inboard surface with a semicircular boss 29 which is engageable with the first and second openings 85 and 86 of the guided portion 84 of the arm member 83 to achieve a soft latching (viz., detect feeling latching) of the guided portion 84 relative to the guide member 27. Thus, the boss-formed resilient piece 28 and the first and second openings 85 and 86 constitute a so-called "position holder". As is seen from FIG. 5, when the boss 29 is engaged with the first opening 85 of the guided portion 84, the movable base member 80 assumes such a position that the lock piece 50 is engageable with the latch member 30. Furthermore, when, as is seen from FIG. 7, the boss 29 is engaged with the second opening 86, the movable base member 80 assumes such a position that the lock piece 50 is not engageable with the latch member 30.

Referring back to FIG. 1, the guided portion 84 has at its inboard side a mounting piece 84a secured thereto. A control lever 40 is secured to the mounting piece 84a. As is seen from FIG. 3, upon assembly, the control lever 40 is projected outward from the back rest cushion 11 through a laterally extending slot 16 formed in a back portion 13 of the cushion 11. Thus, when the cushion 11 assumes its raised position, the control lever 40 is exposed to the tunnel "T" and thus the lever 40 is operable from the trunk room "A". The slot 16 has at its one end a recess 17 projected downward. A spring 41 (see FIG. 5) is associated with the control lever 40 to bias the same downward. Thus, when sliding leftward in FIG. 3, the control lever 40 finally falls into the recess 17 and thus the lever 40 is caught by the same. It is to be noted that when the control lever 40 is kept caught by the recess 17, the boss 29 of the resilient member 28 is engaged with the first opening 85 of the guided portion 84 of the movable base member 80, while, when the control lever 40 gets over the recess 17 and comes to a middle portion 16b (see FIG. 3) of the slot 16, the boss 29 is brought into engagement with the second opening 86 of the guided portion 84.

Operation will be described in the following with reference to the drawings.

Figure 3:
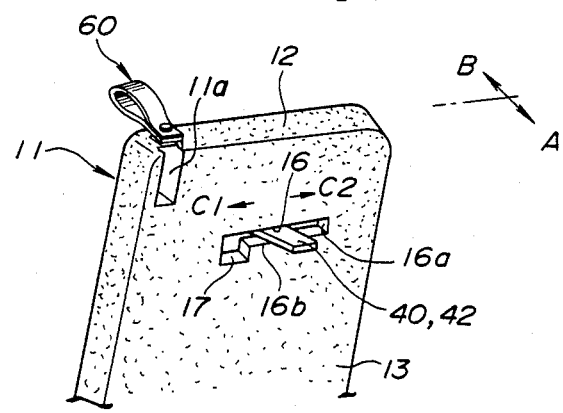
FIG. 3 is a perspective back view of the inclinable back rest cushion.

For ease of understanding, the description will be commenced with respect to a condition wherein the back rest cushion 11 is in its raised and latched condition and the control lever 40 assumes the middle position 16b of the slot 16 as shown in FIG. 3. Under this condition, the latch device 20 installed in the back rest cushion 11 assumes the condition of FIG. 7. That is, the boss 29 of the resilient piece 28 is in engagement with the second opening 86 of the guided portion 84 of the movable base member 80, and the stopper flange 54 of the lock piece 50 is separated from the leading end 32 of the latch member 30 by a given distance so that the lock piece 50 is not engageable with the latch member 30. That is, the latch member 30 is in a condition to be turnable for releasing the striker 15.

When, under this condition, the pull strap 60 is pulled from the passenger room "B", the latch member 30 is pivoted about the shaft 24 in a counterclockwise direction in FIG. 7 against the bising force of the spring 25 thereby releasing the striker 15 from the catching cut 30a. During this, the connecting pin 73 of the latch member 30 travels in the arcuate slot 72 of the lock cancelling lever 70. Thus, further pull of the strap 60 induces a forward inclination (or folding) of the back rest cushion 11 thereby exposing the tunnel "T" to the passenger room "B".

When, with the back rest cushion 11 raised and latched, the control lever 40 (see FIG. 3) slides and falls into the recess 17, the movable base member 80 is moved in the direction of the arrow "C1" to the position wherein the boss 29 of the resilient piece 28 is engaged with the first opening 85 of the guided portion 84. Due to this movement of the movable base member 80, the lock piece 50 on the movable base member 80 approaches the latch member 30 and the connecting pin 76 moves in and along the respective slots 75 and 21b of the lock cancelling lever 70 and the fixed base member 21. Thus, the lock piece 50 comes to a position where the stopper flange 54 thereof is engageable with the latch member 30 as shown in FIG. 5.

When, with the latch device 20 assuming this condition, the pull strap 60 is pulled from the passenger room "B", the latch member 30 is instantly brought into abutment with the stopper flange 54 of the lock piece 50 and thus the same is prevented from making a sufficient pivoting about the shaft 24 in a counterclockwise direction in FIG. 5, that is, in the striker releasing direction. Thus, the latched engagement between the latch member 30 and the striker 15 is not cancelled.

When thereafter the control lever 40 is pushed up against the biasing force of the spring 41 and slided to the middle position 16b of the slot 16 getting out the recess 17, the latch device 20 is returned to the aforementioned condition of FIG. 7.

For inclining the back rest cushion 11 forward from the trunk room "A", the following steps are taken.

That is, the control lever 40 assuming the middle position 16b of the slot 16 is further slided in the direction of the arrow "C2" to the rightmost position 16a of the slot 16 (see FIG. 3). Thus, the movable base member 80 is moved in the same direction, so that the connecting pin 76 is instantly brought into contact with a left end (as viewed in FIG. 7) of the slot 75 of the lock cancelling lever 70 and thus pulls the lever 70 leftward in FIG. 7. Due to this leftward movement of the lever 70, a right end of the arcuate slot 72 of the lock cancelling lever 70 pulls the connecting pin 73 leftward and thus pivots the latch member 30 against the biasing force of the spring 25 in a counterclockwise direction in FIG. 7, that is, in the striker releasing direction. Because the lock piece 50 is moved leftward together with the lock cancelling lever 70, the counterclockwise pivoting of the latch member 30 is not obstructed by the lock piece 50. Finally, the latch device 20 assumes the condition of FIG. 8 wherein the latch member 30 releases the striker 15. Under this condition, the forward inclination of the back rest cushion 11 is carried out by pushing the same from the trunk room "A". With this, the tunnel "T" is exposed to the passenger room "B".

When the back rest cushion 11 is kept folded with the control lever 40 put in the recess 17 (see FIG. 3) of the slot 16, the latch device 20 assumes the condition of FIG. 5 wherein the lock piece 50 is at the position engageable with the latch member 30. When the back rest cushion 11 is raised and put into the tunnel "T", the striker 15 is brought into abutment with the arm portion 92 of the crank lever 90 and thus pivots the lever 90 about the pivot pin 91 in a clockwise direction in FIG. 5. The pivot movement of the crank lever 90 causes the pin 94 on the other arm portion 93 to push and pivot the lock piece 50 in a counterclockwise direction against the biasing force of the spring 52 to an angular position wherein, as is shown in FIG. 6, the stopper flange 54 of the lock piece 50 is placed away from the travelling path of the latch member 30. Thus, when the back rest cushion 11 is about to be put into the tunnel "T", the striker 15 pushes the latch member 30 leftward in FIG. 6 against the biasing spring 25 and is finally caught by the catching recess 30a of the latch member 30. With this, the back rest cushion 11 is fully raised and latched in the tunnel "T".

Although the above-mentioned embodiment is described on the arrangement wherein both the lock piece 50 and the lock cancelling lever 70 are operated by the common control lever 40, the lock piece 50 and the lock cancelling levers 70 may be operated by respective control levers.

In the described embodiment, the lock piece 50, the lock casncelling lever 70 and the crank lever 90 are all mounted on the movable base member 80. If desired, these members 50, 70 and 90 may be mounted to the fixed base member 21 in such a manner that the lock piece 50 and the lock cancelling lever 70 are movable relative to the fixed base member 21. Of course, in this case, a measure is employed so that the lock cancelling movement of the lever 70 induces a movement of the lock piece 50 to a position away from the travelling path of the latch member 30.

As is described hereinabove, in the latch device 20 according to the present invention, the folding (viz., forward inclination) of the back rest cushion 11 is available from the trunk room "A" even when the cushion 11 has been locked. The setting of the back rest cushion 11 to the tunnel "T" is easily achieved by only raising the cushion 11 and pushing the same into the tunnel 11.

What is claimed is:

1. In a seatback having a back rest cushion inclinable in relation to a tunnel in the seatback,
    a latch device for latching said back rest cushion to said seatback when said back rest cushion is snugly received in said tunnel, which comprises:
    a striker secured to said seatback;
    a first base member fixed to said back rest cushion to move therewith;
    a latch member pivotally connected to said first base member and latchingly engageable with said striker when said back rest cushion is received in said tunnel;
    a pull strap fixed to said latch member for pivoting said latch member in a direction to release said latch member from said striker when pulled in a given direction;
    a lock member movably mounted to said first base member, said lock member being movable to a position to obstruct the pivoting of said latch member in the striker releasing direction;
    a lock member actuating member movably mounted to said first base member, said actuating member moving said lock member away from the travelling path of said latch member when pushed by said striker;
    a lock cancelling member movably mounted to said first base member for moving said latch member in the striker releasing direction when moved in a given direction by a given distance; and
    means for manually moving both said lock member and said lock cancelling member from a back side of said back rest cushion.

2. A latch device as claimed in claim 1, in which said means comprises:
    a second base member which is movably mounted on said first base member, said second base member carrying thereon said lock member, said lock member actuating member and said lock cancelling member; and
    a structure connected to said second base member to move therewith, said structure having a portion which is projected outward from a slot formed in a back portion of said back rest cushion.

3. A latch device as claimed in claim 2, in which said structure comprises;
    an arm member having one end fixed to said second base member;
    a control lever connected to said arm member to move therewith, said control lever having one end exposed to the outside of said back rest cushion through said slot.

4. A latch device as claimed in claim 3, in which the other end of said arm member is formed with a guided portion which is slidably received in a guide member fixed to a frame member of said back rest cushion.

5. A latch device as claimed in claim 4, further comprising a position holding means by which positioning of said second base member relative to said first base member is carried out in a snap action manner.

6. A latch device as claimed in claim 5, in which said position holding means comprises:
    a resilient piece fixed to said guide member, said resilient piece having a small projection on its leading end; and
    openings formed in said guided portion of said arm member, said small projection being brought into engagement with one of said openings when said second base member comes to a given position relative to said first base member.

7. A latch device as claimed in claim 3, further comprising a control lever locking means which locks said control lever when said control levers comes to a given position in said slot.

8. A latch device as claimed in claim 7, in which said locking means comprises:
    pivot means for pivotally connecting said control lever to said arm member;
    a spring for biasing said control lever in a given direction with respect to said arm member; and
    means for defining a recess at an end of said slot.

9. A latch device as claimed in claim 2, in which said lock member is pivotally connected to said second base plate through a pivot pin and biased by a spring to pivot about the pivot in a given direction.

10. A latch device as claimed in claim 9, in which said lock member is formed with a stopper flange to which said lock member actuating member is engageable.

11. A latch device as claimed in claim 10, in which said lock member actuating member is a crank lever pivotally connected to said second base member through a pivot pin, said crank lever having one end portion engageable with said striker and the other end engageable with said lock member.

12. A latch device as claimed in claim 11, in which said the other end of said crank lever is formed with a pin which is engageable with said stopper flange of said lock member.

13. A latch device as claimed in claim 12, in which said lock cancelling member comprises one arm portion pivotally connected through a first connecting pin to said latch member and the other arm portion pivotally connected to said second base member through a second connecting pin.

14. A latch device as claimed in claim 13, in which said one arm portion of the lock cancelling member is formed with an elongate slot through which said first connecting pin passes, and in which the other arm portion of the lock cancelling member is formed with an elongate slot through which said second connecting pin passes.

15. A latch device as claimed in claim 14, in which said elongate slot of said one arm portion is curved to accommodate an arcuated movement of said first connecting pin driven by said latch member.

16. A latch device as claimed in claim 15, in which said pivot pin of said lock member and said second connecting pin of said lock cancelling member have respective portions which are slidably received in parallelly extending elongate openings formed in said first base member.

17. A latch device as claimed in claim 6, in which said guide member is formed with a cut for receiving therein a major portion of said resilient piece.

18. A latch device as claimed in claim 1, in which said latch member is biased by a spring in a direction to achieve a latching engagement with said striker.

19. A latch device as claimed in claim 18, in which said latch member is formed with a catching recess for catching said striker.

* * * * *